(12) United States Patent
Dauneria et al.

(10) Patent No.: US 10,474,222 B2
(45) Date of Patent: Nov. 12, 2019

(54) MANAGING EFFECTS OF A SCHEDULED OUTAGE OF MAINS POWER

(71) Applicant: TELEFONAKTIEBOLAGET LM ERICSSON (PUBL), Stockholm (SE)

(72) Inventors: Ankur Dauneria, New Delhi (IN); Sandeep Akhouri, New Delhi (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 413 days.

(21) Appl. No.: 15/312,403

(22) PCT Filed: May 21, 2014

(86) PCT No.: PCT/SE2014/050624
§ 371 (c)(1),
(2) Date: Nov. 18, 2016

(87) PCT Pub. No.: WO2015/178810
PCT Pub. Date: Nov. 26, 2015

(65) Prior Publication Data
US 2017/0083072 A1    Mar. 23, 2017

(51) Int. Cl.
*G06F 1/329* (2019.01)
*H04W 24/00* (2009.01)
(Continued)

(52) U.S. Cl.
CPC .............. *G06F 1/329* (2013.01); *G06F 1/266* (2013.01); *G06F 1/305* (2013.01); *H04W 4/70* (2018.02);
(Continued)

(58) Field of Classification Search
CPC .......... G06F 1/329; G06F 1/305; G06F 1/266; H04W 4/70; H04W 52/0277;
(Continued)

(56) References Cited

U.S. PATENT DOCUMENTS 6,633,823 B2 * 10/2003 Bartone .................... H02J 3/14
700/295
9,220,058 B1 * 12/2015 Choong ............ H04W 52/0251
(Continued)

OTHER PUBLICATIONS

Extended European Search Report dated May 22, 2017; issued in European Patent Application No. 14892499.6, 7 pages.
(Continued)

*Primary Examiner* — Will W Lin
(74) *Attorney, Agent, or Firm* — Rothwell, Figg, Ernst & Manbeck, P.C.

(57) ABSTRACT

A method, in a node of a communication network, for managing effects of a scheduled outage of mains power is disclosed. The method comprises receiving a notification of a scheduled outage of mains power (A), the notification comprising a location to be affected by the scheduled outage and a time period during which the scheduled outage is scheduled. The method further comprises identifying mains powered devices registered on the communication network and situated in the notified location (B), discovering an entity affected by an outage of at least one of the identified devices (D), and informing the discovered entity that the identified devices are scheduled to be without power during the notified time period (F). Also disclosed area computer program product for carrying out the above method and a communication network node (100, 200) configured to carry out the above method.

19 Claims, 15 Drawing Sheets

(51) Int. Cl.
*H04W 24/04* (2009.01)
*G06F 1/26* (2006.01)
*G06F 1/30* (2006.01)
*H04W 52/02* (2009.01)
*H04W 4/70* (2018.01)

(52) U.S. Cl.
CPC .......... *H04W 24/00* (2013.01); *H04W 24/04* (2013.01); *H04W 52/0277* (2013.01); *Y02D 70/00* (2018.01); *Y02D 70/1226* (2018.01); *Y02D 70/1262* (2018.01); *Y02D 70/146* (2018.01); *Y02D 70/21* (2018.01)

(58) Field of Classification Search
CPC ...... H04W 24/04; H04W 24/00; Y02D 70/21; Y02D 70/1226; Y02D 70/00; Y02D 70/146; Y02D 70/1262
See application file for complete search history.

(56) References Cited

U.S. PATENT DOCUMENTS

| | | | |
|---|---|---|---|
| 9,401,977 B1* | 7/2016 | Gaw | H04W 52/0254 |
| 9,785,505 B1* | 10/2017 | Narzisi | G06F 11/1451 |
| 2003/0078698 A1* | 4/2003 | Bradford | H02J 3/14 |
| | | | 700/286 |
| 2006/0217936 A1* | 9/2006 | Mason | G01D 4/004 |
| | | | 702/188 |
| 2008/0272934 A1* | 11/2008 | Wang | H02J 3/14 |
| | | | 340/870.11 |
| 2011/0067033 A1 | 3/2011 | Fletcher et al. | |
| 2012/0226930 A1 | 9/2012 | Colban et al. | |
| 2013/0047041 A1* | 2/2013 | Chen | G06F 11/004 |
| | | | 714/47.3 |
| 2013/0258928 A1 | 10/2013 | Wong et al. | |
| 2014/0119201 A1* | 5/2014 | Kim | H04W 74/0833 |
| | | | 370/242 |
| 2014/0155025 A1* | 6/2014 | Parker | H04W 4/24 |
| | | | 455/406 |
| 2015/0100166 A1* | 4/2015 | Baynes | G05B 15/02 |
| | | | 700/278 |
| 2015/0263522 A1* | 9/2015 | Bernal | H02J 13/001 |
| | | | 700/295 |

OTHER PUBLICATIONS

International Search Report dated Feb. 3, 2015, in International Application No. PCT/SE2014/050624, 4 pages.
"3rd Generation Partnership Project: Technical Specification Group Services and System Aspects; System improvements for Machine-Type Communications (MTC)", Release 11; 3GPP TR 23.868 V11.0.0; 3rd Generation Partnership Project (3GPP); Mobile Competence Centre; 650, Route Des Lucioles; F-06921 Sophia-Antipolis Cedex, France; Sep. 2012, 165 pages.
"Machine-to-Machine communications (M2M); Functional architecture", ETSI TS 102 690 V2.1.1; ETSI 650, Route Des Lucioles; F-06921 Sophia-Antipous Cedex, France; Oct. 2013; 332 pages.

* cited by examiner

MANAGING EFFECTS OF A SCHEDULED OUTAGE OF MAINS POWER

CROSS REFERENCE TO RELATED APPLICATION(S)

This application is a 35 U.S.C. § 371 National Phase Entry Application from PCT/SE2014/050624, filed May 21, 2014, designating the United States, the disclosure of which is incorporated herein in its entirety by reference.

The present invention relates to managing the effects of scheduled power outages though a communication network. The consequences of scheduled power outages may be felt at a network level through traffic fluctuations arising from the impact of power outages upon stationary connected devices. Alternatively the effects may be felt at a user level through the unavailability of stationary connected devices or the machines, tools or utilities with which they are associated.

BACKGROUND TO THE INVENTION

Cellular communication networks continue to experience rapid growth, with the number of devices connected via such networks forecast to increase substantially in the near future. It is expected that machine type devices (MTDs) will contribute significantly to this forecast increase in connected devices. Machine type devices are autonomous, often very small devices typically associated with equipment or apparatus as opposed to a human user. MTDs use cellular or other types of communication networks to communicate with an application server, which may or may not be comprised within the cellular network. The application server receives information from the MTD and configures the MTD remotely to provide a particular functionality. MTDs represent a subset within the larger category of User Equipment devices (UEs), and may also be referred to as machine to machine (M2M) devices. Applications employing MTDs may facilitate activates in a wide range of service areas, examples of which are set out in table 1 below:

TABLE 1

| Service Area | MTC applications |
| --- | --- |
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/ Control | Sensors |
| | Lighting |
| | Pumps |
| | Valves |
| | Elevator control |
| | Vending machine control |
| | Vehicle diagnostics |

TABLE 1-continued

| Service Area | MTC applications |
| --- | --- |
| Metering | Power |
| | Gas |
| | Water |
| | Heating |
| | Grid control |
| | Industrial metering |
| Consumer Devices | Digital photo frame |
| | Digital camera |
| | eBook |

As may be appreciated from the above examples, many thousands of MTDs may be deployed at a particular location supporting a wide range of MTC applications. Unlike traditional user equipment devices, a large number of such devices will be substantially stationary, and may be powered using mains power supply.

Considerable advances have been made in modernising the supply of mains power, for example through the introduction of Smart Grids and Automated Demand Response Management. Smart Grids are electrical power supply grids that use communication technology to gather and act on information in an automated manner with the goal of improving the efficiency and reliability of energy production and distribution. Automated Demand Response Management is a system allowing communication between energy supplies and consumers, enabling automated response to pricing changes and electrical grid load fluctuations, thus improving the balance between supply and demand in energy production and distribution. Despite such advances, scheduled power outages remain a reality for many energy consumers. In developing economies in particular, where rapidly expanding energy demand frequently outstrips supply, regular power outages are common. In India for example, population 1.2 billion, very few metropolitan locations enjoy 24×7 mains power supply, and for the 65% of the population who live in rural and semi-urban areas, scheduled power outages may be a daily occurrence. Even where mains power is more or less constantly available, grid maintenance work may require temporary interruption of power supply, and meteorological or other factors may lead to precautionary action on the part of energy suppliers to impose power outages at certain times and in certain locations.

Nascent and developing M2M ecosystems, and the communications networks that support them, may be particularly impacted by the scheduled power outages discussed above, with large numbers of M2M devices in a single location going offline, and coming back online, at the same time. As developing economies increasingly adopt networked models of society, industry and commerce, challenges remain in managing the impact that intermittent mains power supply may have upon such activities and the communications networks that support them.

SUMMARY

It is an aim of the present invention to provide methods and apparatus which assist in addressing at least one or more of the challenges mentioned above.

According to an aspect of the present invention, there is provided a method, in a node of a communication network, for managing effects of a scheduled outage of mains power. The method comprises receiving a notification of a scheduled outage of mains power, the notification comprising a location to be affected by the scheduled outage and a time period during which the scheduled outage is scheduled and identifying mains powered devices registered on the communication network and situated in the notified location. The method further comprises discovering an entity affected by an outage of at least one of the identified devices, and informing the discovered entity that the identified devices are scheduled to be without power during the notified time period.

In some examples, informing the discovered entity may comprise sending a message to the discovered entity, the message comprising identifiers of the identified devices and the notified time period. In further examples, the method may further comprise selecting from among the identified devices those devices affecting the discovered entity, determining an identifier for each of the selected devices with respect to the discovered entity, and assembling the determined identifiers into the message.

In some examples, informing the discovered entity may comprise publishing identifiers of the identified devices and the notified time period to a platform accessible by the discovered entity.

In some examples, the method may further comprise calculating an impact upon network resources of the scheduled power outage. The calculated impact may for example comprise a signalling load or bandwidth usage associated with a start time or end time of the scheduled outage, or with the duration of the scheduled outage.

In some examples, the discovered entity comprises a network management node. The network management node may for example comprise a Policy Control and Charging (PCC) node.

In some examples, the discovered entity may comprise an application or service provider.

In some examples, discovering an entity affected by an outage of at least one of the identified devices may comprise discovering what applications or services are running on at least one of the identified devices.

In some examples, the discovered entity may comprise a recommendation engine.

In further examples, the discovered entity may comprise a Demand Response Automation Server (DRAS). The DRAS may for example form part of a Demand Response Management System facilitating communication between utility providers and consumers.

In some examples, receiving a notification of a scheduled outage of mains power may comprise receiving a notification directly from a mains power provider.

In further examples, receiving a notification of a scheduled outage of mains power may comprise receiving a notification from a Demand Response Automation Server.

In some examples, the method may further comprise, after identifying mains powered devices registered on the communication network and situated in the notified location, removing from the identified devices any devices supplied with mains power by a supplier other than the supplier scheduling the notified scheduled outage.

In some examples, identifying mains powered devices registered on the communication network and situated in the notified location may comprise identifying Machine Type Communication Devices registered on the communication network and situated in the notified location.

In some examples, identifying mains powered devices registered on the communication network and situated in the notified location may comprise identifying stationary Machine Type Communication Devices registered on the communication network and situated in the notified location.

According to another aspect of the present invention, there is provided a method, in a network node, for managing effects on a communications network of a scheduled outage of mains power. The method comprises receiving a message identifying mains powered devices registered on the communication network and affected by the scheduled outage, and applying at least one of a Quality of Service or Bandwidth or Charging policy according to the received message. The message comprises identifiers of the affected devices and a time period during which the scheduled outage is scheduled.

In some examples, the policy may be applied during the time period during which the scheduled outage is scheduled, and may take account of network resources made available by affected devices being deprived of mains power. In other examples, the policy may be applied after the time period during which the scheduled outage is scheduled, and may take account of increased resource demand from affected devices seeking to reconnect to the communication network.

Examples of the at least one Quality of Service (QoS) or Bandwidth or Charging policy include: QoS and bandwidth profiles for affected devices before and during outage, QoS and bandwidth profiles for affected devices after outage, on reconnection to network, policy rules for bandwidth allocations during and after outage, upload and download bandwidth rules during and after outage, rules relating to maximum or minimum bitrates during and after outage, charging rules relating to services and applications during and after outage, session based rules, service specific rules during and after outage, and QoS rules according to service type.

According to another aspect of the present invention, there is provided a computer program product configured, when run on a computer, to carry out a method according to the first aspect of the present invention.

According to another aspect of the present invention, there is provided a communication network node configured for managing effects of a scheduled outage of mains power. The node comprises a notification unit configured to receive a notification of a scheduled outage of mains power, the notification comprising a location to be affected by the scheduled outage and a time period during which the scheduled outage is scheduled. The node further comprises a device identifying unit configured to identify mains powered devices registered on the communication network and situated in the notified location, an entity discovery unit configured to discover an entity affected by an outage of at least one of the identified devices, and a communication unit configured to inform the discovered entity that the identified devices are scheduled to be without power during the notified time period.

In some examples, the communication unit may be configured to send a message to the discovered entity, the message comprising identifiers of the identified devices and the notified time period.

In further examples, the communication unit may be configured to select from among the identified devices those devices affecting the discovered entity, determine an identifier for each of the selected devices with respect to the discovered entity and assemble the determined identifiers into the message.

In some examples, the communication unit may be configured to publish identifiers of the identified devices and the notified time period to a platform accessible by the discovered entity.

In some examples, the method may further comprise an impact unit configured to calculate an impact upon network resources of the scheduled power outage.

In some examples, the discovered entity may comprise a network management node.

In some examples, the discovered entity may comprise an application or service provider.

In some examples, the entity discovery unit may be configured to discover what applications or services are running on at least one of the identified devices.

In some examples, the discovered entity may comprise a recommendation engine.

In some examples, the discovered entity may comprise a Demand Response Automation Server.

In some examples, the method may further comprise a supplier unit configured to remove from the identified devices any devices supplied with mains power by a supplier other than the supplier scheduling the notified scheduled outage.

In some examples, the device identifying unit may be configured to identify Machine Type Communication Devices registered on the communication network and situated in the notified location.

In some examples, the device identifying unit may be configured to identify stationary Machine Type Communication Devices registered on the communication network and situated in the notified location.

According to another aspect of the present invention, there is provided a communication network node configured for managing effects of a scheduled outage of mains power, the communication network node comprising a processor and a memory, the memory containing instructions executable by the processor whereby the communication network node is operative to receive a notification of a scheduled outage of mains power, the notification comprising a location to be affected by the scheduled outage and a time period during which the scheduled outage is scheduled, identify mains powered devices registered on the communication network and situated in the notified location, discover an entity affected by an outage of at least one of the identified devices, and inform the discovered entity that the identified devices are scheduled to be without power during the notified time period.

According to another aspect of the present invention, there is provided a communication network node configured for managing effects on a communications network of a scheduled outage of mains power. The communication network node comprises a receiving unit configured to receive a message identifying mains powered devices registered on the communication network and affected by the scheduled outage, and a policy unit configured to apply at least one of a Quality of Service or Bandwidth policy according to the received message. The message comprises identifiers of the affected devices and a time period during which the scheduled outage is scheduled.

According to another aspect of the present invention, there is provided a communication network node configured for managing effects on a communications network of a scheduled outage of mains power. The communication network node comprises a processor and a memory, the memory containing instructions executable by the processor whereby the communication network node is operative to receive a message identifying mains powered devices registered on the communication network and affected by the scheduled outage, and apply at least one of a Quality of Service or Bandwidth or Charging policy according to the received message. The message comprises identifiers of the affected devices and a time period during which the scheduled outage is scheduled.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

As discussed above, aspects of the present invention provide a method, in a node of a communication network, for managing effects of a scheduled outage of mains power. Such outages may be scheduled by mains power suppliers for varying reasons, as discussed above. The method comprises receiving a notification of a scheduled outage of mains power, the notification comprising a location to be affected by the scheduled outage and a time period during which the outage is scheduled to take place. The method further comprises identifying mains powered devices registered on the communication network and situated in the notified location. The method further comprises discovering an entity affected by an outage of at least one of the identified devices, and informing the discovered entity that the identified devices are scheduled to be without power during the notified time period.

In will be appreciated that devices registered on the communication network and powered by mains power supply will be essentially stationary devices, and hence in large proportion MTC devices, as devices associated with a human user are almost without exception required to be mobile and are hence battery powered. Aspects of the present invention are thus particularly applicable to management of effects of power outages as experienced in M2M ecosystems.

In order to provide further context to embodiments of the present invention, there follows a brief discussion of the logical and functional architecture supporting M2M communication.

Figure 1:
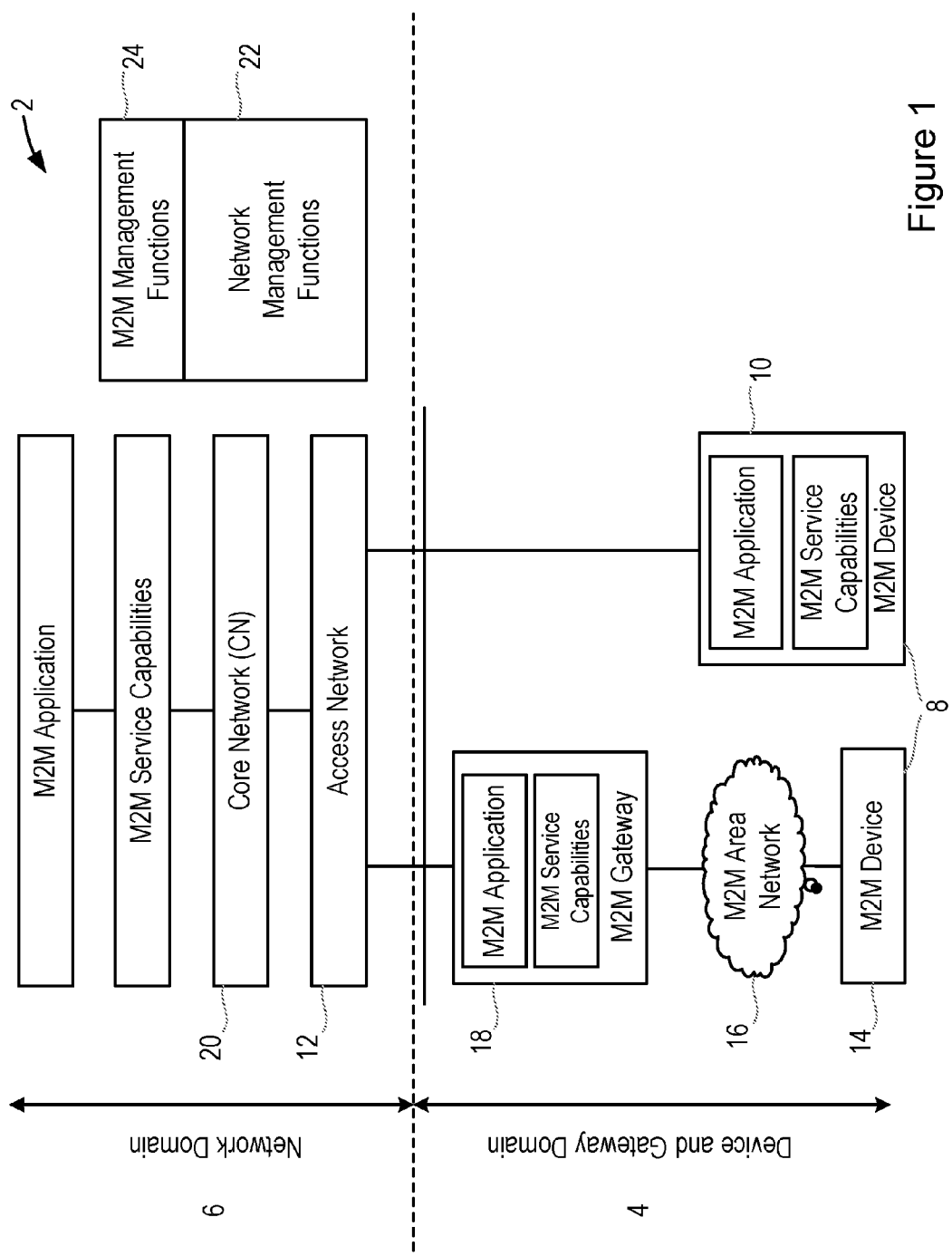
FIG. 1 is a schematic representation of an example functional architecture supporting M2M communication.

An example of a functional architecture supporting M2M communication is illustrated in FIG. 1. The example architecture is drawn from the European Telecommunications Standards Institute (ETSI) Machine to Machine (M2M) standard. The example functional architecture 2 of FIG. 1 includes a Device and Gateway Domain 4 and a Network Domain 6. M2M devices 8 in the Device and Gateway Domain 4 may connect to M2M application servers in the Network Domain 6 either directly or via local M2M area networks. Example M2M device 10 runs an M2M Application using M2M Service Capabilities, and connects to the appropriate M2M application server in the Network Domain 6 via the Access Network 12. In contrast, example M2M device 14 is part of an M2M Area Network 16 which provides connectivity between a group of M2M devices and an M2M Gateway 18. The M2M Gateway 18 runs multiple M2M Applications using M2M Service Capabilities, and acts as a proxy between the M2M devices of the M2M Area Network 16 and the Network Domain 6.

In the Network Domain 6, the Access Network 12 allows M2M device 10 and M2M Gateway 18 to communicate with the Core Network 20. Example access networks include xDSL, HFC, satellite, GERAN, UTRAN, eUTRAN, W-LAN and WiMAX. The Core Network 20 provides Internet Protocol (IP) connectivity, service and network control functions, interconnection with other networks, roaming and optional additional features. Examples of Core Networks include the $3^{rd}$ Generation Partnership Project (3GPP) core network, ETSI TISPAN core network and 3GPP2 core network. Network management functions 22 comprise functions required to manage the Access and Core Networks, including for example Provisioning, Supervision, Fault Management, etc.

M2M Service Capabilities may be found as M2M Service Capability Layers in the M2M device 10, M2M gateway 18 and in the Network Domain 6. M2M Service Capabilities provide M2M functions that are to be shared by different M2M Applications and the M2M Service Capabilities expose these functions through a set of open interfaces. M2M Service Capabilities in the Network Domain 6 may use Core Network functionalities and may simplify and optimize Application development and deployment by hiding network specifics from M2M Applications. M2M Applications run service logic and use M2M Service Capabilities, accessible via an open interface, to deliver functionality and manage and remotely configure M2M devices. M2M management functions 24 comprise the functions required to manage M2M Service Capabilities in the Network Domain. The management of the M2M Devices and Gateways uses a specific M2M Service Capability.

Figure 2A:
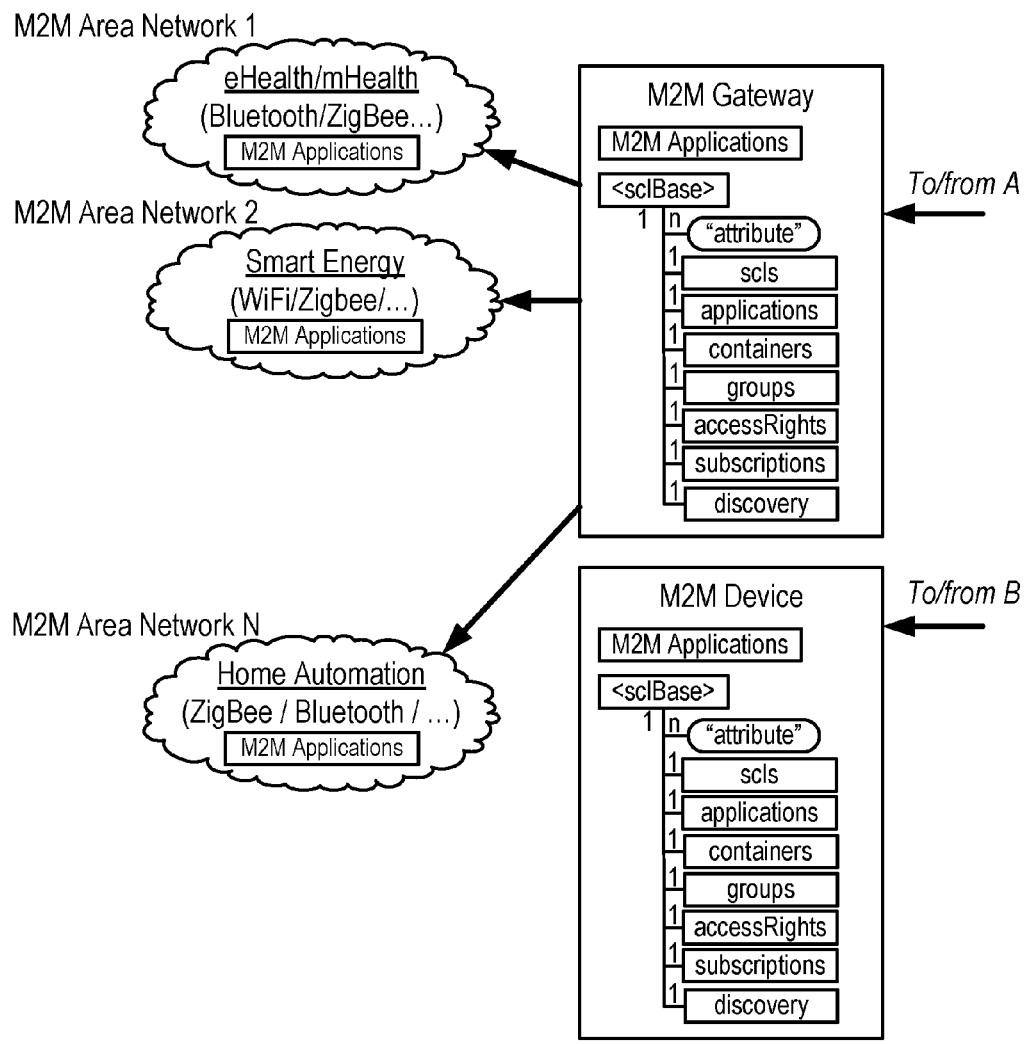
FIGS. 2a and 2b are an illustration of different examples of M2M nodes.
Figure 2B:
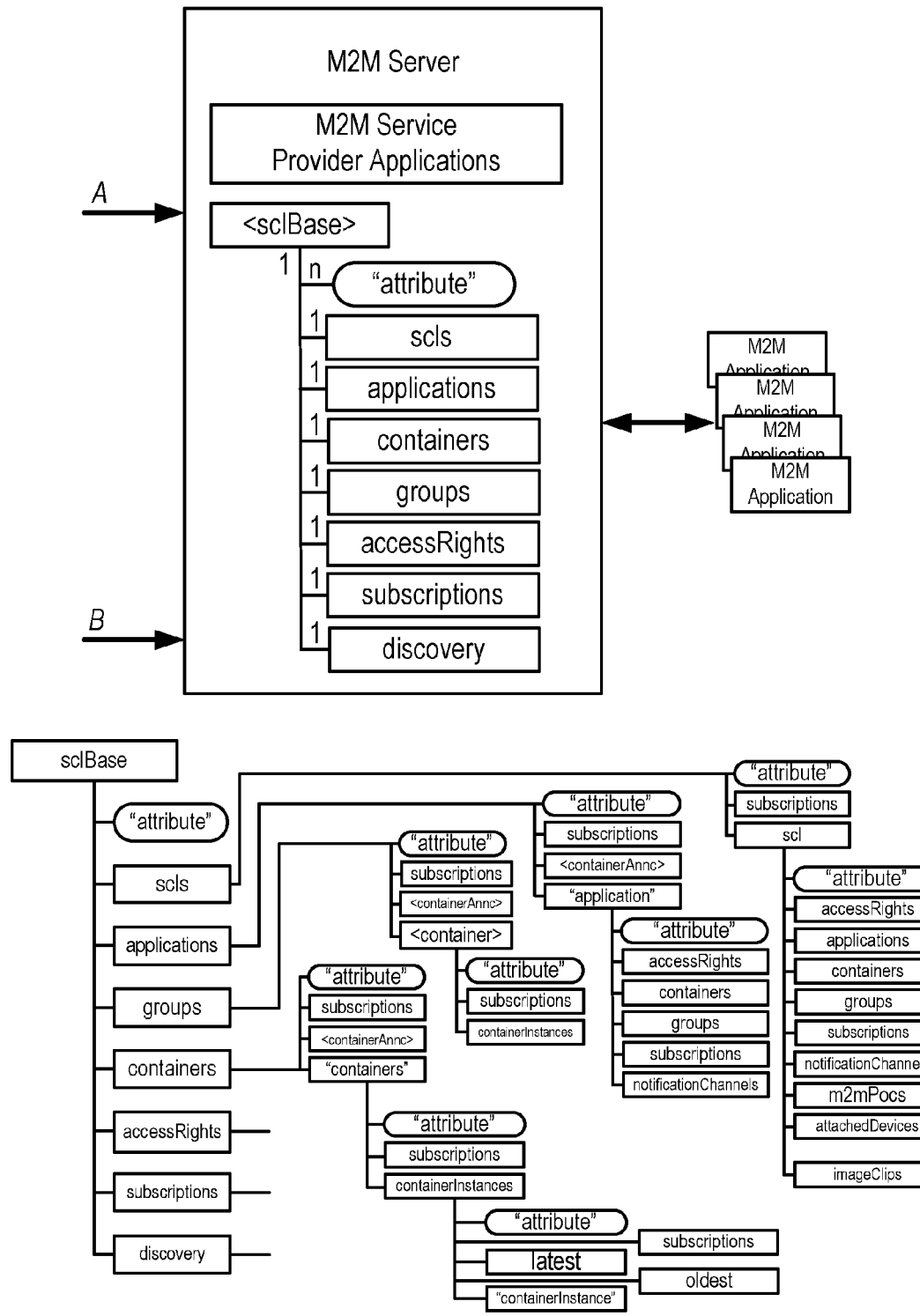

An M2M device, gateway or core element may be represented logically as an M2M node. An M2M Node includes a Service Capabilities Layer and optionally an M2M Service Bootstrap function and an M2M Service Connection function. An M2M Node relies on a Secured Environment Domain, controlled by the M2M Service Provider associated with the Service Capabilities Layer, to protect Sensitive Functions and Sensitive Data. An illustration of different examples of M2M nodes is shown in FIGS. 2a and 2b.

Figure 3:
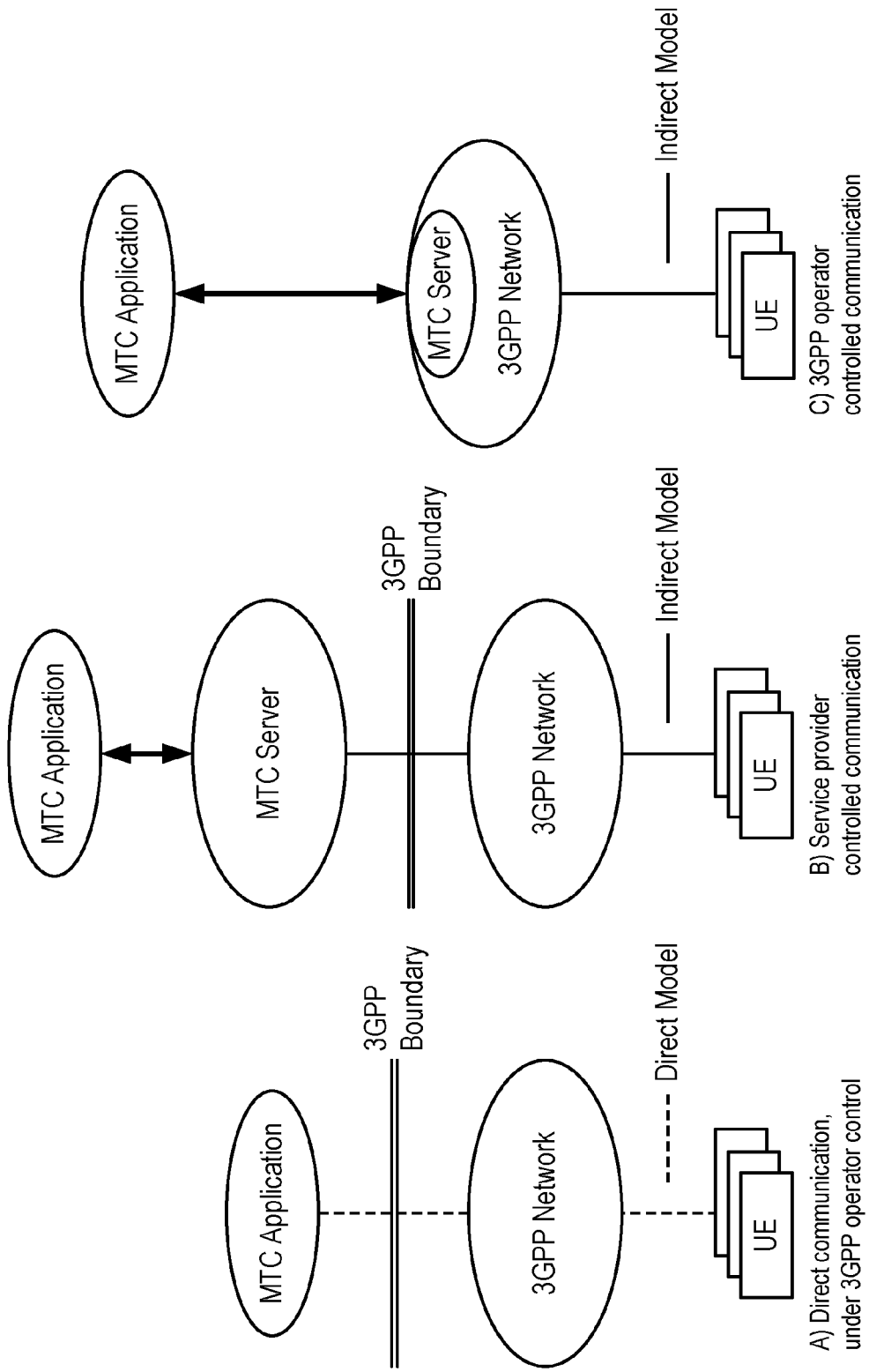
FIG. 3 illustrates direct and indirect models of communication between an M2M UE and an application.
Figure 4:
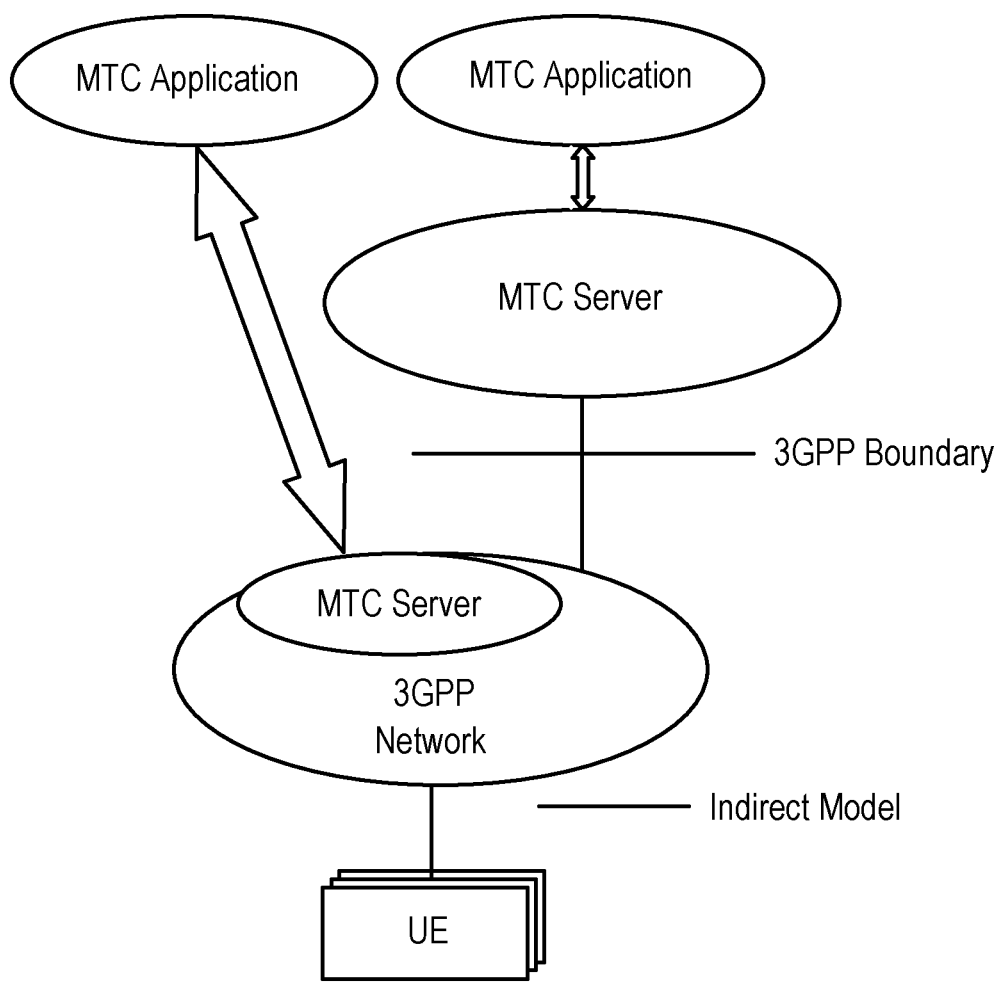
FIG. 4 illustrates multiple communication models used by a single M2M UE.

As discussed above, M2M or MTC devices are a subset within the larger category of User Equipment devices (UEs), and communicate with M2M application servers over a communication network such a 3GPP network. The M2M application server may be located within or outside the 3GPP network, and a single UE running multiple M2M Applications may communicate with different M2M application servers in different ways, as illustrated in FIGS. 3 and 4. FIG. 3a illustrates a Direct Communication Model between the MTC UE and the appropriate MTC Application, the communication being under the control of the 3GPP network operator. FIG. 3b illustrates an Indirect Model of communication under the control of a Service Provider, with the 3GPP network providing connectivity to an MTC Server located outside the 3GPP network. FIG. 3c illustrates another Indirect Model of communication under the control of the 3GPP network operator. In this example, the MTC server is located within the 3GPP network. FIG. 4 illustrates multiple MTC applications running on a single MTC UE and using different Communication Models.

According to embodiments of the present invention, a new node is introduced into the network architecture of a communication network supporting M2M functionality. The new node, referred to as a blackout management node, is located within the network domain of the communication network architecture. The blackout management node is configured to receive information from energy providers concerning scheduled power outages, to identify stationary, mains powered devices registered on the network and affected by the scheduled power outages on the basis of the received information, and to provide intelligence on the identified devices to entities which would be affected by an outage of at least one of the identified devices. Such entities are referred to in the following description as stakeholders in the affected devices. Stakeholders may include any entity having a relation to an identified device and may for example include other elements within the network domain of the communication network, including for example core network elements. Alternatively or in addition, stakeholders may include network or application service providers, recommendation engines, power management systems such as Demand Response Automated Servers or other entities.

Figure 5:
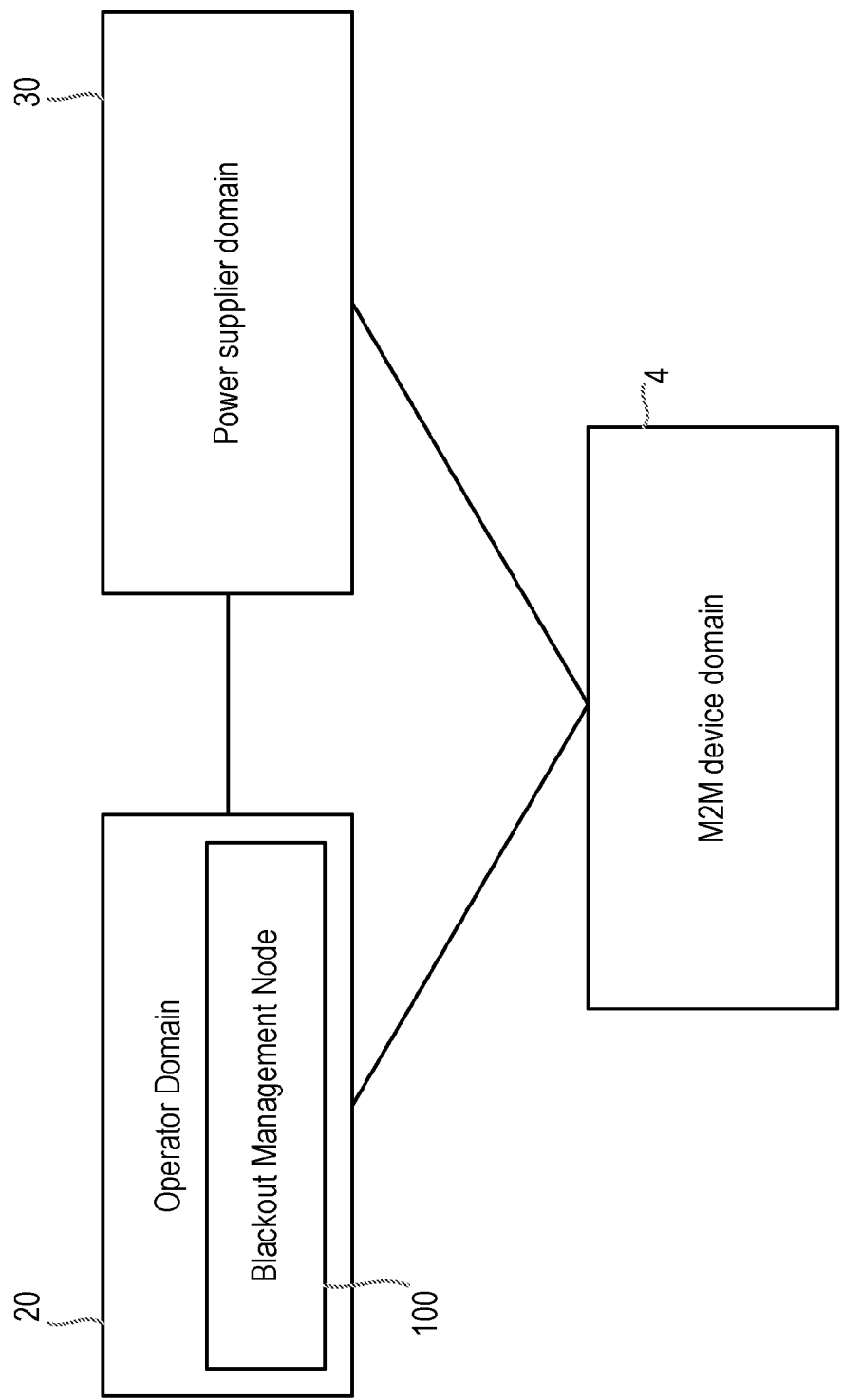
FIG. 5 is a schematic illustration of the basic connectivity of a blackout management node.

FIG. 5 is a schematic illustration of the basic connectivity of a blackout management node. Referring to FIG. 5, a blackout management node 100 is located within the core network 20 of a communication network such as a 3GPP communication network. The blackout management node 100 is configured to exchange messages with an Energy Supplier Domain 30, which may include management functions of different utility providers, secondary suppliers, Demand Response Management Systems and other entities generating and/or supplying mains power to consumers. The blackout management node 100 is also configured to exchange messages with the M2M Devices Domain 4, within which are located M2M devices and gateways, and/or with other elements within the 3GPP network, which may be other core network 20 elements or other elements outside of the core network 20 but within the 3GPP network domain. The blackout management node 100 may also exchange messages with M2M Application servers and recommendation engines located outside the 3GPP network (not shown).

Figure 6:
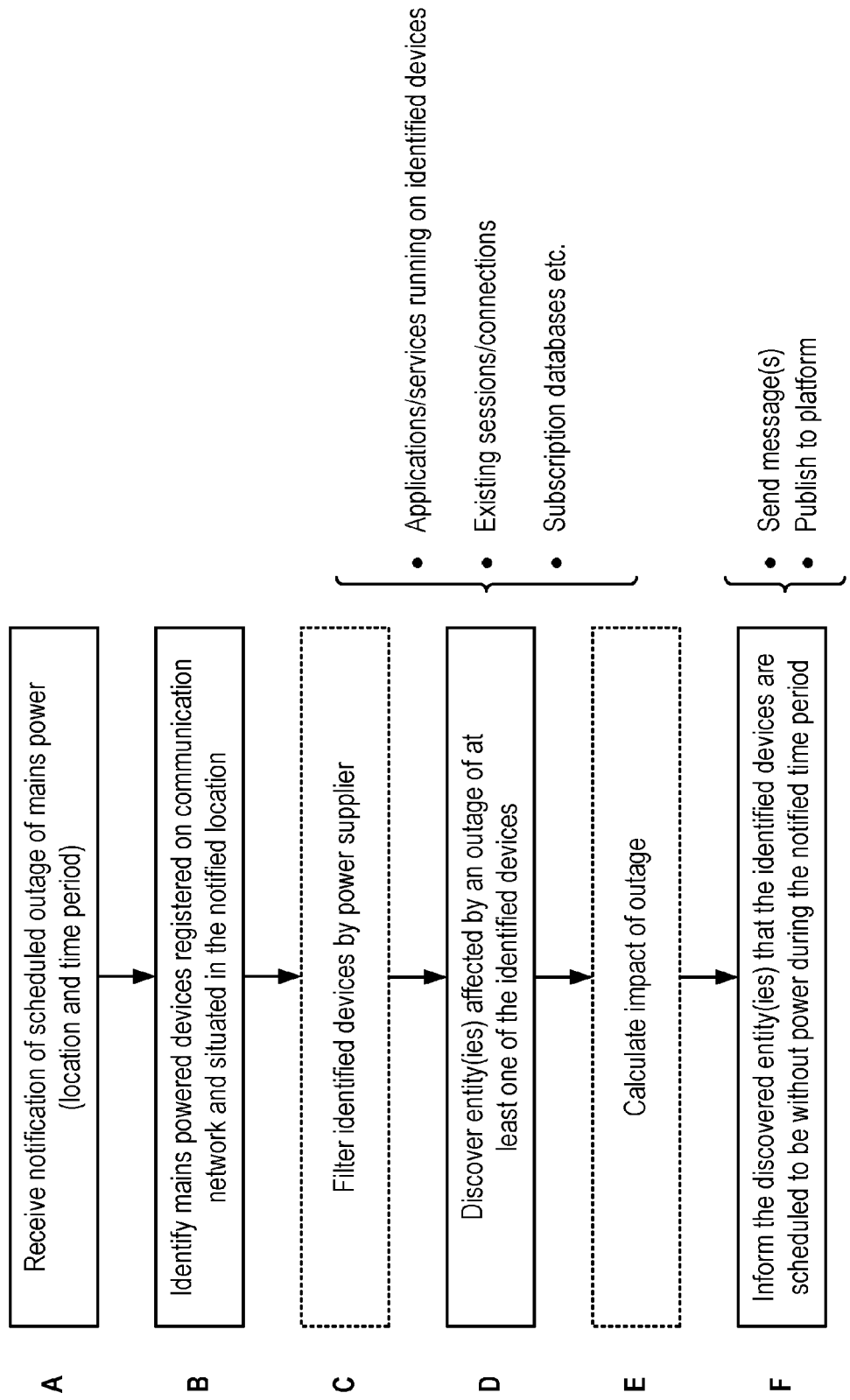
FIG. 6 is a flow chart illustrating functioning of a blackout management node.

FIG. 6 is a flow chart illustrating an example of how the blackout management node 100 may manage effects of a scheduled outage of mains power. The blackout management node acts primarily as a facilitator, receiving notifications of scheduled power outages, generating actionable intelligence on the basis of these notifications and then making this intelligence available to affected entities. The affected entities may then take appropriate steps to mitigate the effects of the outage within their area of application. With reference to FIG. 6, in a first step A, the blackout management node 100 receives a notification of a scheduled outage of mains power. The notification is received from the Energy Supplier Domain 30, and may for example be received from a smart grid management function of a utility provider, or from another management or cooperation element within a utility provider, secondary supplier or any other entity generating and/or supplying mains power to consumers. The notification may also or alternatively be received from an element of a Demand Response Management System such as Demand Response Automated Server (DRAS). The notification provides details of the scheduled power outage including a location to be affected by the outage, for example the boarders of a geographic area to be affected, and a time period during which the outage is scheduled. This may for example be conveyed by providing start and end times for the outage, or a start time and a duration.

The power outage notification received at step A may be sent a predetermined time before any scheduled power outage. The predetermined time, or advance time of the message, may be agreed between the relevant energy service provider and the operator of the network within which the blackout management node 100 is located. Alternatively, the message may be sent by the energy supplier as soon as the power outage is scheduled or confirmed.

On receipt of the power outage message, the blackout management node 100 then proceeds, at step B, to identify mains powered devices registered on the communication network and situated in the notified location. As discussed above, mains powered connected devices may typically be M2M devices and may be stationary M2M devices, and the following discussion uses M2M devices as an example case. The devices may be identified individually or in groups, according to how the devices are organised with respect to the network.

The M2M devices or device groups located within the geographic area affected by the scheduled power outage may be identified by the blackout management node 100 on the basis of the geographic location of the M2M devices and device groups supported by the network. The physical location of a user equipment device may be established by the network to which it is connected in a number of ways according to standard network procedures which are not discussed in detail here. In the case of stationary M2M devices, this location may be established once by the network on the occasion of the first connection by the device to the network, and the location may be stored for example in the Home Location register of an LTE network or in another suitable entity. A simple comparison between M2M device or device group location and affected geographic area may then be sufficient to identify devices within the notified location to be affected by the power outage.

After identifying the M2M devices situated within the affected location, the blackout management node 100 may optionally perform an additional filtering step C according to mains power supplier. It is possible that a single geographic area could be supplied with power from multiple different utilities providers. The blackout management node may thus check the mains power supplier of the identified devices and remove from the identified devices any device supplied with power by a utility provider other than the provider scheduling the power outage which has been notified. Such devices will be unaffected by the scheduled outage and thus need not be considered further. Information as to the mains power supplier for a particular device or device group may be contained within subscriber data associated with the device and held within a network database.

After performing the optional filtering step C, the blackout management node 100 then proceeds, at step D to discover stakeholders in the identified devices, that is to discover entities affected by outage of at least one of the identified devices. Stakeholders may be located within the communication network supporting identified devices, or may include service, application or utilities providers for the devices, applications running on the devices, device users etc. The process of discovering stakeholders may comprise interrogating network databases, examining existing or past network connections or consulting entities external to the network. Example stakeholders and processes by which they may be discovered are discussed in further detail below.

A first example stakeholder in the identified devices may be a Policy Control and Charging (PCC) node of the communication network. The PCC node may assist in resource management for the network, provisioning the network resources over which the identified devices communicate. The scheduled power outage will cause the identified devices to go offline and then come back online, on mass, at the start and end times of the scheduled power outage. As the PCC assists in provisioning the network resources to allow for network connection signalling and other communication, the PCC of the communication network may be considered a stakeholder in the identified devices and may be discovered by confirming the identity of the communication network servicing the devices.

Other example stakeholders in the identified devices may include providers of applications or services running on the identified devices. The functionality provided to an ultimate end user via these applications and services may be significantly affected by the power outage to the identified devices on which they are running. Application or service providers may thus be considered as stakeholders in the identified devices and may be discovered by determining which applications and services are running on the identified devices, and/or examining network connections and/or sessions involving the identified devices.

Another example stakeholder may be a recommendation engine associated with one or more of the identified devices. Such engines are commonly used to provide options to end users where a number of devices are available to fulfil a user's requirements. Recommendation engines concerned with identified devices may be considered as stakeholders in the identified devices as the quality of their recommendations would be degraded if they were to erroneously present identified devices to a user as available during a scheduled power outage.

Another example stakeholder may be an element of a Demand Response Management System such as a DRAS. A DRAS typically communicates with a range of geographically separate Energy Management Systems at client sites for a utility provider, facilitating communication to enable dynamic management of power supply. Much of the information provided to a DRAS may be supplied via M2M devices and such information will thus not be available to the DRAS during a scheduled power outage affecting those M2M devices. In addition, a large signalling load will be experienced by the DRAS at the end of the power outage, when the affected M2M devices attempt to reconnect to the server. A DRAS communicating with identified devices may thus be considered as a stakeholder in the identified devices, and may be discovered by interrogating a database or examination of network connections involving the identified devices.

Other stakeholders including ultimate end users, providers of additional network services etc may be envisaged, and it will be appreciated that a single identified device may be associated with a plurality of stakeholders any or all of which may be discovered at step D according to different embodiments of the method.

Following completion of steps B and D, according to various embodiments of the method, the blackout management node 100 may have some or all of the following actionable intelligence concerning the notified scheduled power outage:

i. the number of M2M devices located within the geographic area affected by the scheduled power outage
ii. the number of M2M device groups located within the geographic area affected by the scheduled power outage
iii. the number of M2M Applications affected by the scheduled power outage
iv. the number of M2M services affected by the scheduled power outage
v. the number of M2M users affected by the scheduled power outage
vi. the identities of the devices and entities comprised in any or all of the above groups.

The blackout management node has thus assembled intelligence providing an indication of the magnitude of the impact of the scheduled power outage that has been notified in terms of mains powered network user equipment devices affected by the outage. In practice, as discussed above, network user equipment devices which are mains powered, and hence stationary, will almost exclusively be M2M user equipment devices, and the blackout management node 100 is thus largely concerned with the consequences of a scheduled power outage for M2M ecosystems supported by the network.

ETSI M2M standard identifiers for the devices, device groups, applications, services and/or users affected by the scheduled power outage may be used, including for example:

a) Application identifier, App-ID
b) SCL identifier, SCL-ID
c) M2M node identifier, M2M-Node-ID
d) M2M Service Connection identifier, M2M-Connection-ID
e) M2M Service Provider identifier, M2M-SP-ID
f) MSBF identifier, MSBF-ID
g) M2M Subscription ID.

It will be appreciated that a single device may be associated with several different identifiers, each identifier being used for a different stakeholder.

Referring again to FIG. 6, after discovering the stakeholders in the identified devices, the blackout management node may optionally perform calculations concerning the impact upon network resources of the scheduled power outage at step E. For example, the blackout management node may calculate the signalling impact of all the network sessions and connections to the identified devices that will go down at the start of the power outage, and which the devices may attempt to re-establish at the end of the power outage.

Following the optional impact calculations at step E, the blackout management node 100 then proceeds to inform the discovered stakeholders that the identified devices are scheduled to be without power during the notified time period for the scheduled power outage. In some examples of the method, the stakeholders may be directly messaged by the blackout management node with the information relevant to that stakeholder. For example, the blackout management node 100 may message the PCC node with a list of identified devices and the times at which they will be going offline and coming back online. Similar lists and times, using the appropriate identifiers for each stakeholder, may be provided to application service providers, access network service providers, recommendation engines, etc. The messages may be sent according to a timetable which may depend upon particular use cases and message recipients but which according to embodiments of the method is before the end of the scheduled power outage and according to preferred embodiments is before the start of the scheduled power outage, thus allowing time for the message recipients to act upon the received messages.

In another example, the blackout management node 100 may inform stakeholders by publishing details of identified devices and times to a platform accessible by the stakeholders via an API. The stakeholders may then query the platform to obtain up to date information concerning devices affected by scheduled power outages. In some examples, both messages and a stakeholder accessible platform may be used to inform the stakeholders, with for example core network elements within the communication network being messaged by the blackout management node and external stakeholders obtaining the relevant information via an API accessible platform.

Figure 7:
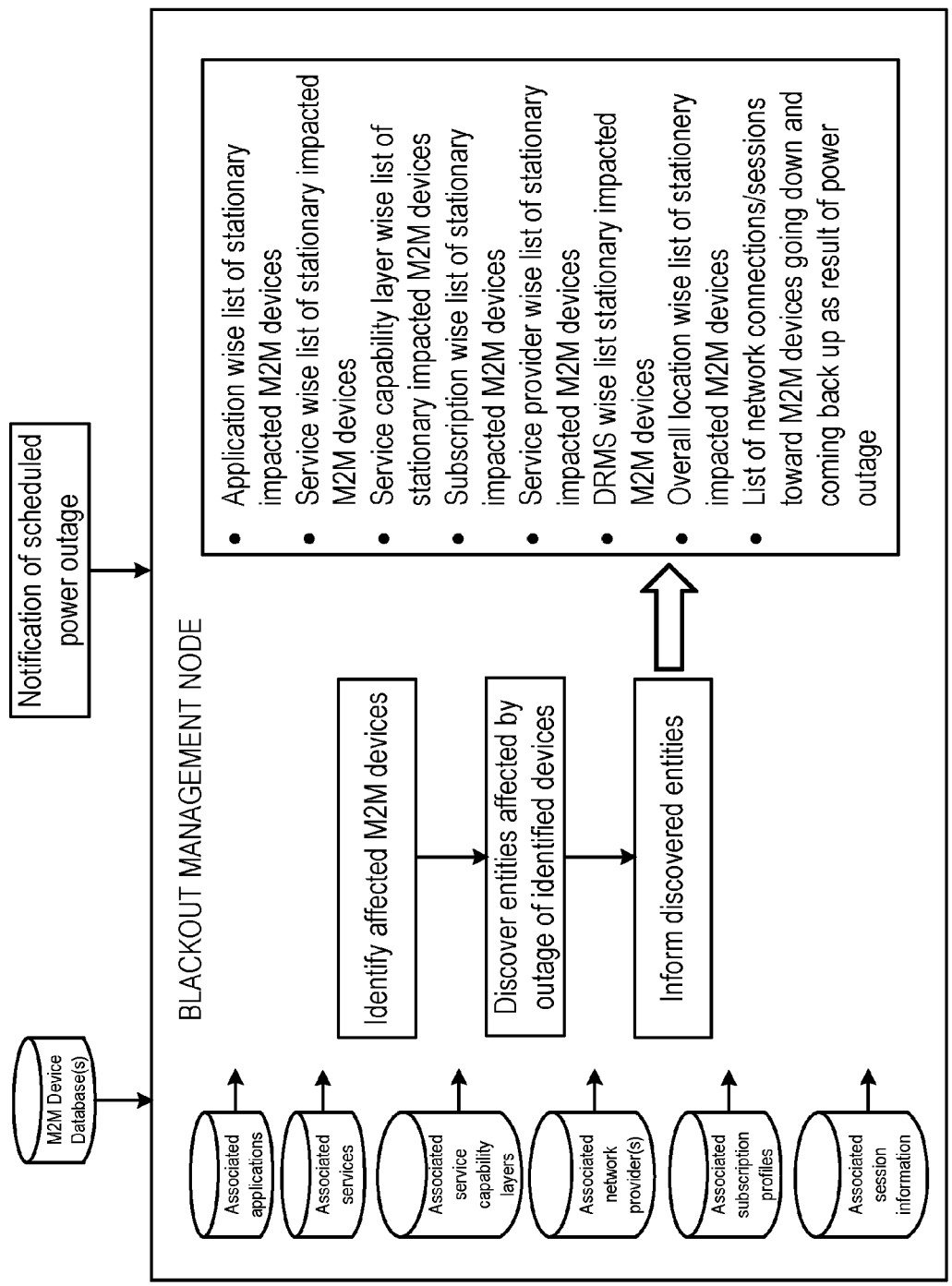
FIG. 7 is a schematic illustration of the information flow in a blackout management node.

FIG. 7 provides a schematic representation of example information flow into and through a blackout management node 100. Referring to FIG. 7, the blackout management node receives notification of scheduled power outages, and accesses an M2M device database to obtain M2M device information, allowing the blackout node to identify M2M devices affected by the scheduled blackout. The blackout management node may also access information concerning associated applications, associated services, associated service capability layers, associated network providers, associated subscription profiles and associated session information. This information may enable the blackout management node to discover affected entities (stakeholders) and prepare appropriate intelligence for the entities. Example intelligence which may be assembled and messaged to discovered entities or published to an accessible platform is shown on the right of FIG. 7 and includes:

An application based list of affected M2M devices
A service based list of affected M2M devices
A service capability layer based list of affected M2M devices
A subscription based list of affected M2M devices
A service provider based list of affected M2M devices
A DRMS based list of affected M2M devices
An overall location based list of affected M2M devices
A list of network connections/sessions toward affected M2M devices On the basis of the information provided by the blackout management node 100, examples of which are shown in FIG. 7 and listed above, the stakeholders may take actions or create policies with the aim of managing or mitigating the effects of the scheduled power outage, within the sphere of influence of the relevant stakeholder. The actions taken may vary widely according to the nature of the affected entity and its functions. Some example actions are discussed in the context of example use cases below, which illustrate how different stakeholders may act upon intelligence received from the blackout management node 100 to manage the effects of a scheduled power outage.

Figure 8:
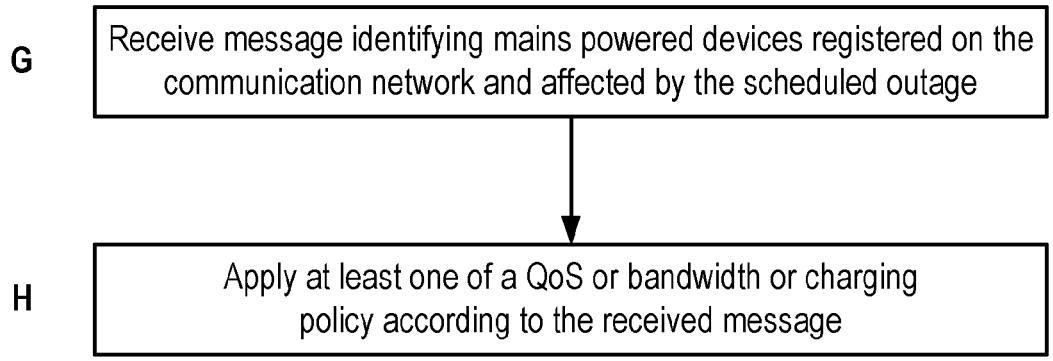
FIG. 8 is a flow chart illustrating functioning of a Policy Control and Charging node.

In a first example use case, the stakeholder is a core network element such as a Policy Charging and Control function (PCC). The PCC may assist the network in managing the network effects of large numbers of stationary connected devices going offline and then coming back online at a specific location and time as a result of a scheduled power outage. According to the example use case, on receipt of a power outage notification, the blackout management node identifies the stationary UEs, or M2M UEs, affected by the scheduled blackout, and assembles relevant intelligence to message to the PCC. This intelligence may include the number of stationary UEs, or M2M UEs, which will be going offline and coming back online at the same time, the times at which the devices will be going offline and coming online, and the network locations servicing these devices. The network locations may for example include basestations such as NodeBs or eNodeBs within the Access Network of the communication network which provides network connectivity to the affected UEs. As illustrated in FIG. 8, the PCC receives this message in a step G and on the basis of the information received from the blackout management node 100, the PCC applies at least one policy for Quality of Service or bandwidth or charging management at step H. The PCC may apply the policy or policies on the basis of calculations which may be conducted in the PCC to determine the effect upon network resources of the indicated large number of devices going offline and coming back online at the same time and at the indicated single location. The network resources freed up by the offline devices may be allocated elsewhere during the outage to provide improved service. In addition, suitable resource provisioning may be made for the high resource demand which will be experienced when multiple devices in the same location attempt to perform connection signalling as soon as mains power is restored. Without suitable provisioning, large numbers of M2M UEs attempting to connect to the network at the same time could significantly clog the network and adversely affect Quality of Service (QoS) for other users. The PCC may provision the impacted location at the relevant time to minimise the impact, and may also create rules or policies to stagger or prioritise access to the network for reconnecting UEs and to ensure QoS for other users is managed appropriately. Access may be granted on a customer basis, QoS basis or service or application basis, with for example certain services or applications made temporarily available or more expensive to access immediately after the end of the scheduled outage, when large numbers of devices are attempting to reconnect to the network and re-establish interrupted sessions. With advance warning of the time, location and magnitude of the impact of the scheduled power outage in terms of affected M2M UEs, the PCC can implement policies to manage network resources at the affected times and location as efficiently as possible, so mitigating the impact of the power outage from a network resource perspective for all network users.

Figure 9:
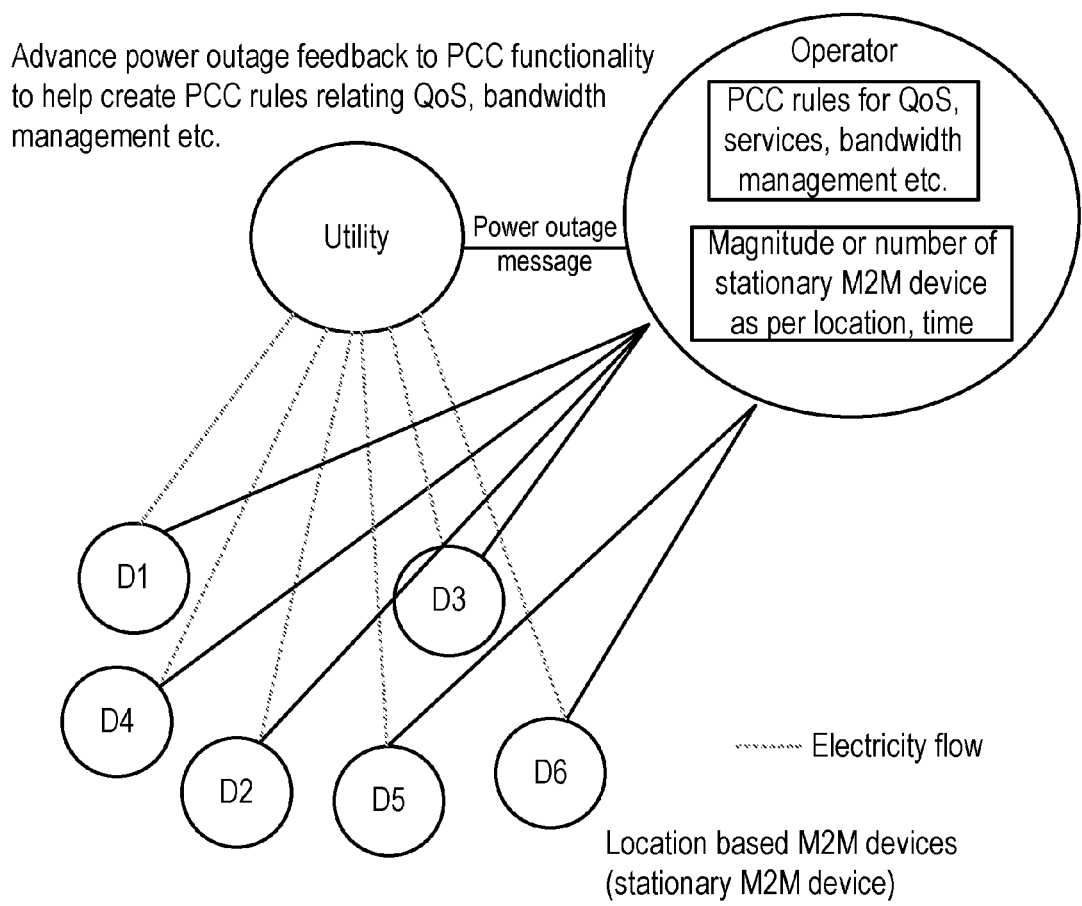
FIG. 9 is a schematic representation of an example use case.

FIG. 9 is a schematic representation of the use case discussed above, with a utility provider sending a power outage notification to the blackout management node 100 of a 3GPP network. The blackout management node identifies the affected M2M devices, discovers the PCC as a stakeholder in the identified devices and messages the PCC with the relevant information, including identifiers for M2M UEs D1 to D6 and the times during which they will be affected by the scheduled outage. The PCC then generates and implements appropriate policies to manage network resources before, during and after the scheduled power outage.

In another example use case, the stakeholder is a recommendation engine, for example a recommendation engine included as part of a navigation service. A recommendation engine for a navigation service may suggest services and amenities available to a user along or near a route currently being navigated. For example, a user of an electric car may request the recommendation engine of a navigation service to suggest charging stations suitable for the electric car along the programmed route. Such charging stations may be associated with an M2M device, for example a smart meter enabling communication between the charging station and the utility provider. In the event of a scheduled blackout affecting the location of a charging station, the station will not be able to charge the user's car. According to embodiments of the present invention, a blackout management node may receive notification of a scheduled power outage and identify the M2M device associated with the charging station as being within the affected area for the power outage. As discussed above, the blackout management node may message individual discovered stakeholders in the identified devices. According to the present use case, the blackout management node additionally or alternatively publishes identifiers for the identified devices as well as the time of the outage to a platform accessible by third party stakeholders, for example via an API. In order to ensure that the recommendation engine provides the most up to date information to the user, the recommendation engine may query the platform made available by the blackout management node in order to obtain information about devices affected by scheduled power outages. On discovering the M2M device associated with a particular charging station to be affected by a power outage at a given time, the recommendation engine may remove that charging station from the list of options presented to the end user during the time of the power outage.

Figure 10:
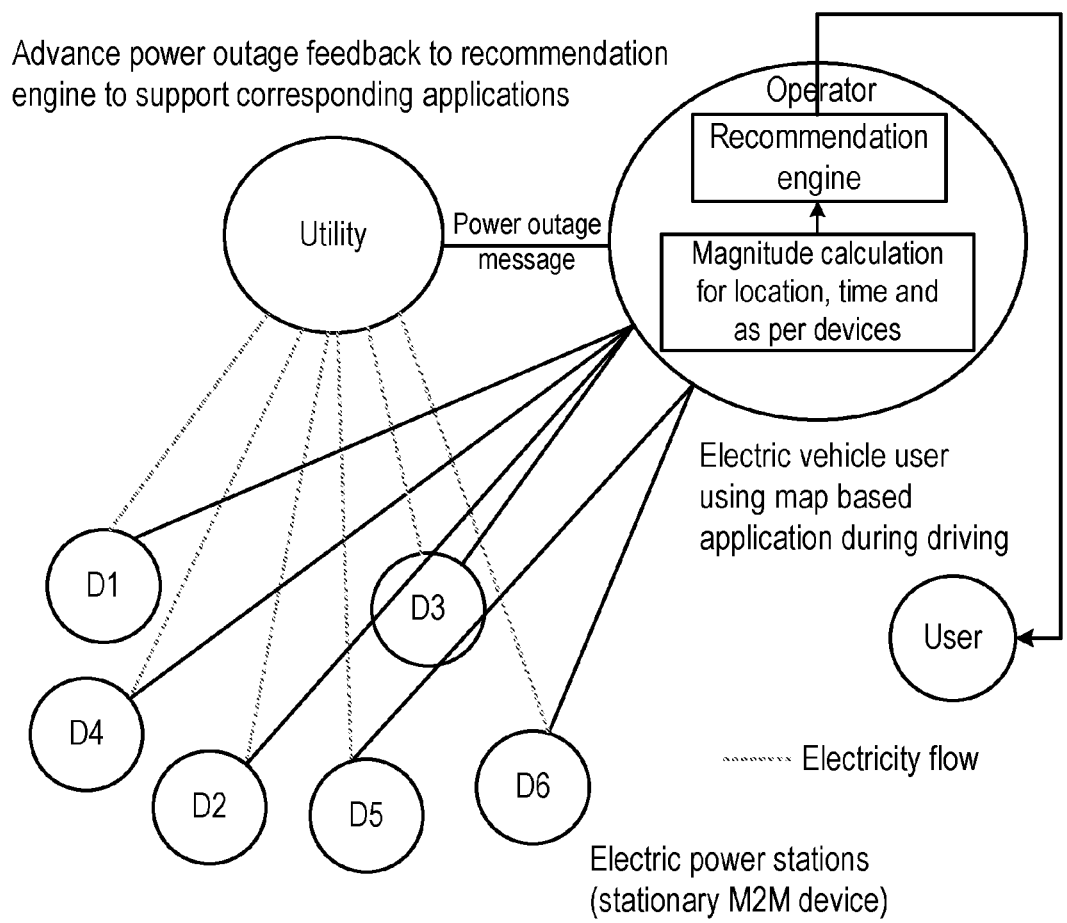
FIG. 10 is a schematic representation of another example use case.

FIG. 10 is a schematic representation of the use case discussed above, with a power outage notification being sent to the blackout management node of a communication network. The blackout management node identifies devices D1 to D6 as being affected by the scheduled blackout and informs the recommendation engine of the navigation service via publication of the identified devices to an accessible platform. The recommendation engine then provides recommendations to an end user taking account of the scheduled power outage and its effects upon devices D1 to D6.

In another example use case, the stakeholder is an application service provider. According to this example use case, the application service provider is a provider of a smart home application, of the kind that manages home appliances associated with M2M devices. The M2M devices associated with the home appliances allow remote control and monitoring of the appliances via an Application running on a home owner's UE, for example a smartphone or tablet. On receipt of a power outage notification, the blackout management node 100 identifies M2M devices in a home running the smart home application as affected by the scheduled outage, as the home is located within the geographic coverage area of the scheduled outage. The blackout management node 100 discovers the smart home application provided by the service provider is a stakeholder in the identified M2M devices on the basis of communication between the devices and an application server. The blackout management component then messages the smart home application service provider, informing the service provider of the time and duration of the power outage and the identity of the devices affected.

On receipt of the information concerning the scheduled power outage and the affected devices, the application service provider may identify the end user or subscriber for the devices and check the user's details to establish which connected appliances are running in the user's home and how the functioning of those appliances may be affected by the scheduled power outage. The application service provider may then reconfigure certain of the appliances to mitigate the effects of the outage, for example programming a washing machine to run before the scheduled outage, or managing the temperature of cold storage or air conditioning units to maintain desired temperatures as long as possible during the loss of mains power. The application service provider may also inform the user of the actions taken, and of additional suggested actions to be taken by the user, for example via the smart home application running on the user's phone or tablet.

Figure 11:
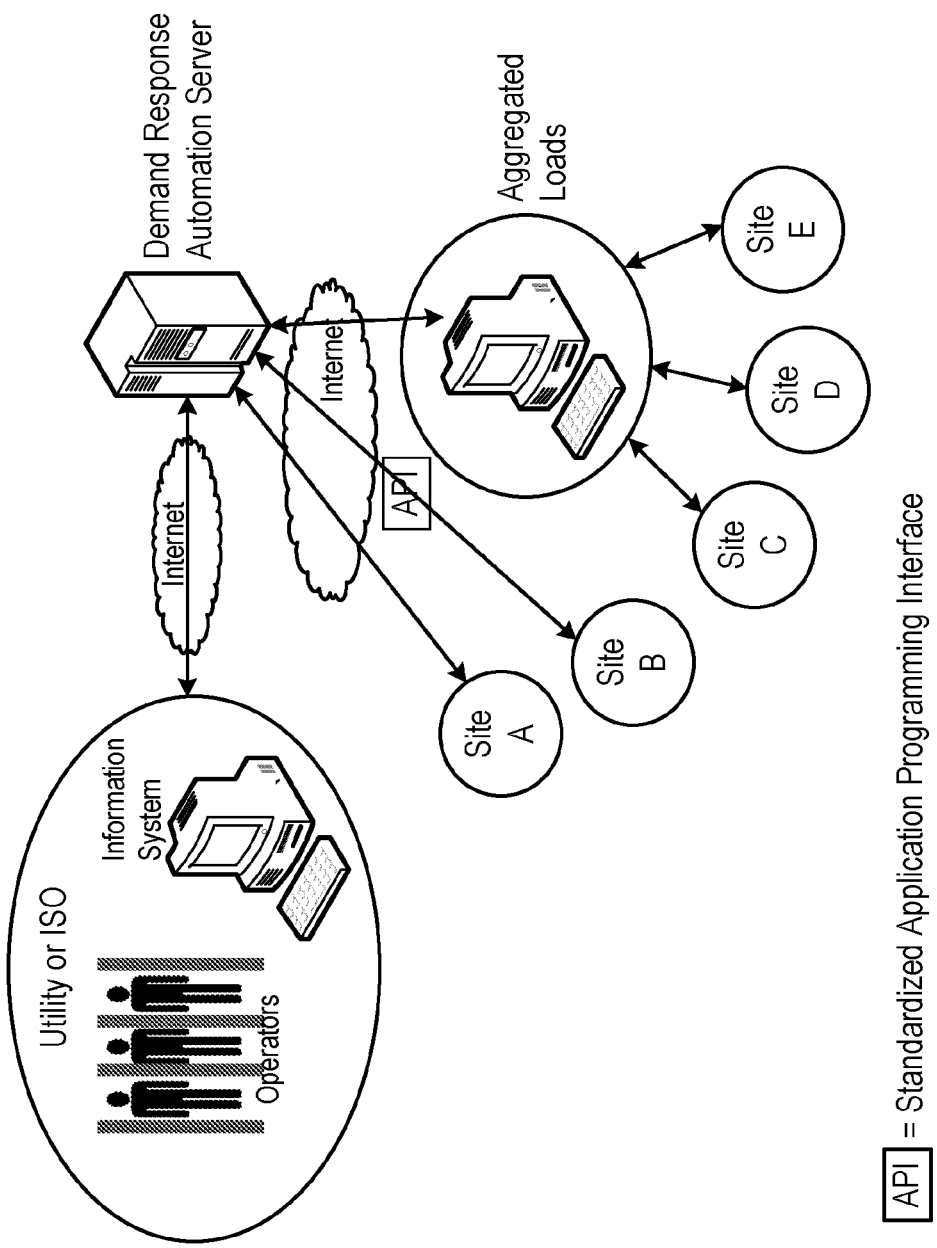
FIG. 11 illustrates an overview of the functioning of Automated Demand Response according to the Open ADR specification.

In another example use case, the stakeholder messaged by the blackout management node is a Demand Response Management System. As discussed above, Automated Demand Response Management is a system allowing communication between energy suppliers and consumers, enabling automated response to pricing changes and electrical grid load fluctuations. The Open ADR (Automated Demand Response) Alliance exists to standardise, automate and simplify Demand Response (DR), providing an open and standardised way for electricity providers and system operators to communicate DR signals with each other and with their customers using a common language over any existing IP based communications network. FIG. 11 provides a representative overview of the functioning of Automated DR according to the Open ADR specification. With reference to FIG. 11, DR is coordinated via a Demand Response Automation Server (DRAS), with both energy providers and consumers communicating with the DRAS. Electrical load variations and pricing fluctuations are communicated to the DRAS by the energy providers. Certain automated responses agreed with energy consumers are then implemented by the DRAS via a signalling exchange with a management system at the consumer. Where no automated response has been agreed to a particular variation at the supplier, a DR request or proposal may be made to a consumer, for consideration by a manager or other responsible person at the consumer.

The DRAS may communicate with energy consumers and suppliers via stationary connected devices such as M2M devices. These devices will also be affected by scheduled power outages, resulting in a large number of devices in a specific area going offline and trying to reconnect to the DRAS server at a specific time. With advance notice of devices to be affected by a scheduled power outage, received from a blackout management node, the DRAS server can better manage the reconnection of large numbers of devices, and plan for the period of no connectivity with the devices during the power outage. The blackout management node may also provide the DRAS server with information from the PCC node concerning rules and priority structures that have been generated by the PCC to manage reconnection to the network of affected devices on resumption of power supply. The DRAS may thus have advance notice of the priority in which devices will regain network connectivity, and so be seeking to reconnect to the DRAS.

Figure 12:
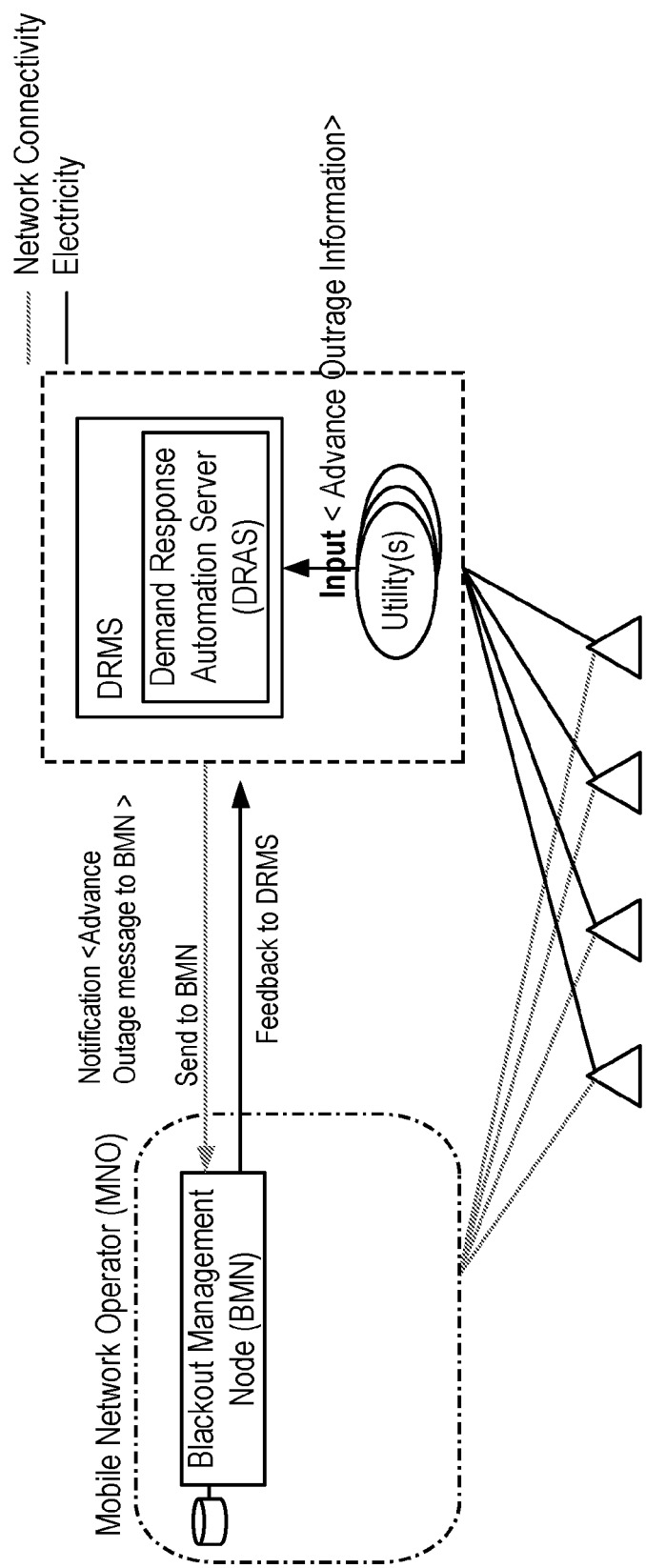
FIG. 12 is a schematic representation of another use case.

FIG. 12 provides a schematic overview of the above discussed use case, with the DRAS receiving scheduled outage information from a utility provider and supplying the blackout management node with an appropriate power outage notification. The blackout management node replies with a message of devices to be affected and optionally additional information concerning rules put in place to manage reconnection of affected devices.

The above example use cases illustrate informing different example stakeholders, via message or publication to an accessible platform. It will be appreciated that multiple stakeholders may be messaged by the blackout management node following receipt of a single power outage message, in conjunction with publication by the blackout management node to an accessible platform, to enable as many stakeholders as possible to take appropriate action to mitigate the effects of a scheduled power outage.

Figure 13:
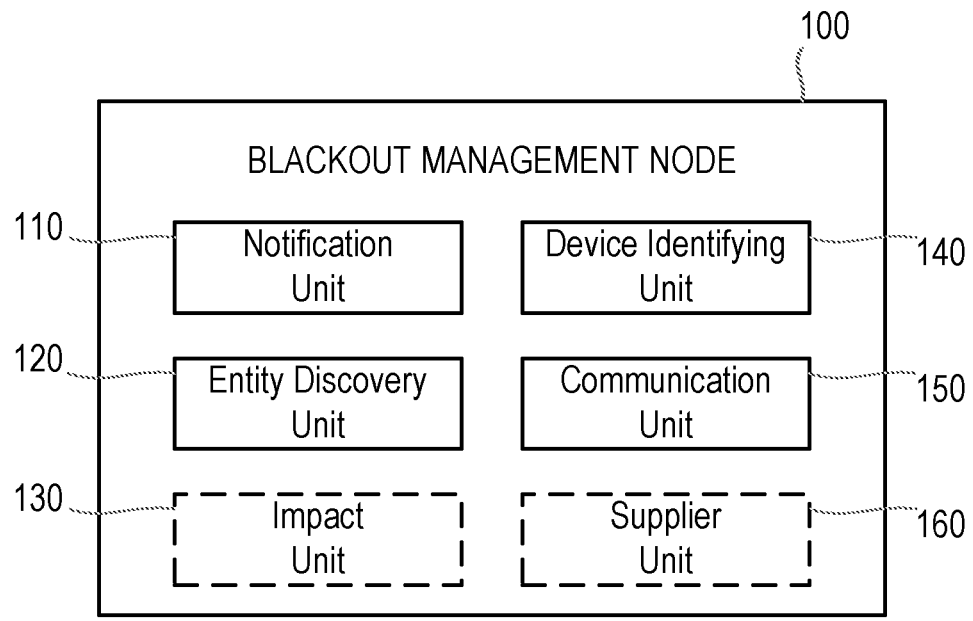
FIG. 13 is a block diagram of a blackout management component.

FIG. 13 illustrates functional units in a blackout management node which may execute embodiments of the method described above, for example according to computer readable instructions received from a computer program. The functional units of FIG. 13 may be incorporated into any communication network node performing the functions of a blackout management node. It will be understood that the units illustrated in FIG. 13 are functional units, and may be realised in any appropriate combination of hardware and/or software.

Referring to FIG. 13, the blackout management node 100 comprises a notification unit 110, a device identifying unit 140, an entity discovery unit 120 and a communication unit 150. The blackout management node may also comprise an impact unit 130 and an supplier unit 160. The notification unit 110 is configured to receive a notification of a scheduled outage of mains power, the notification comprising a location to be affected by the scheduled outage and a time period during which the scheduled outage is scheduled. The device identifying unit 140 is configured to identify mains powered devices registered on the communication network and situated in the notified location. The entity discovery unit 120 is configured to discover an entity affected by an outage of at least one of the identified devices. The communication unit 150 is configured to inform the discovered entity that the identified devices are scheduled to be without power during the notified time period. The impact unit 130, if present, is configured to calculate an impact upon network resources of the scheduled power outage. The supplier unit 160, if present, is configured to remove from the identified devices any devices supplied with mains power by a supplier other than the supplier scheduling the notified scheduled outage.

Figure 14:
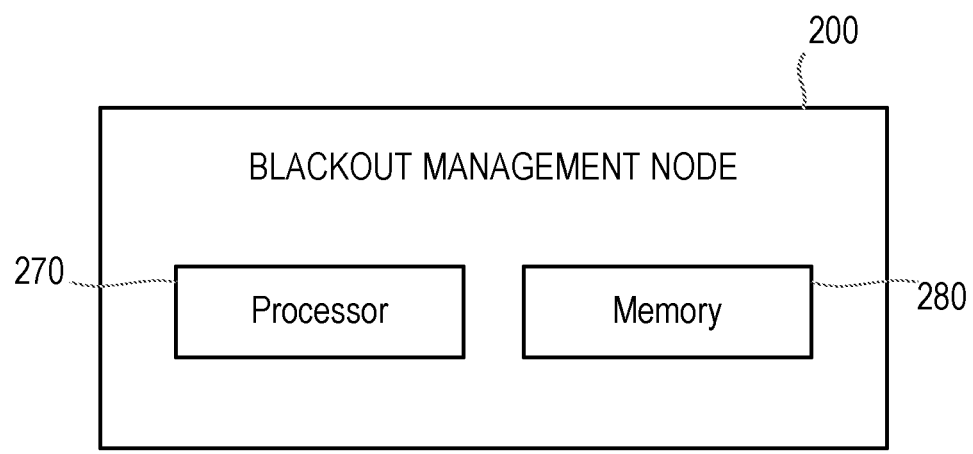
FIG. 14 is a block diagram of another example of blackout management component.

FIG. 14 illustrates another example of blackout management node 200 which may be configured to conduct the method discussed above. The blackout management node 200 comprises a processor 270 and a memory 280. The memory 280 contains instructions executable by the processor 270 such that the blackout management node 200 is operative to conduct the steps of the method described above.

Figure 15:
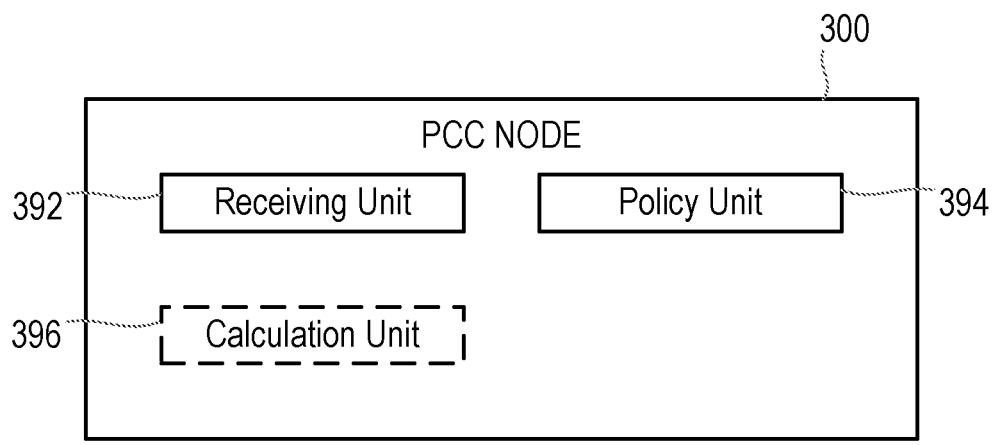
FIG. 15 is a block diagram of a Policy Control and Charging unit.

FIG. 15 illustrates functional units in a PCC node 300 which may execute the steps discussed above with reference to the PCC use case, for example according to computer readable instructions received from a computer program. It will be understood that the units illustrated in FIG. 15 are functional units, and may be realised in any appropriate combination of hardware and/or software.

Referring to FIG. 15, the PCC node 300 comprises a receiving unit 392 and a policy unit 394. The receiving unit 392 is configured to receive a message identifying mains powered devices registered on the communication network and affected by the scheduled outage. The policy unit is configured to apply at least one of a Quality of Service or Bandwidth policy according to the received message. The PCC node 300 may also comprise a calculation unit 396 configured to calculate an effect upon network resources of the identified devices going offline and coming back online at the same time.

Figure 16:
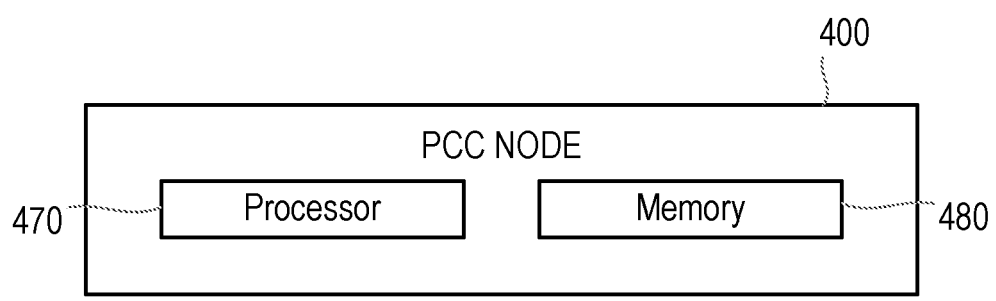
FIG. 16 is a block diagram of another example of Policy Control and Charging unit.

FIG. 16 illustrates another example of PCC node 400 which may be configured to conduct the steps discussed above with reference to the PCC as a stakeholder. The PCC node 400 comprises a processor 470 and a memory 480. The memory 480 contains instructions executable by the processor 470 such that the PCC node 400 is operative to conduct the steps of the described above with reference to the PCC as a stakeholder.

Embodiments of the present invention thus enable stakeholders in systems incorporating stationary connected devices to manage the effects of a scheduled mains power outage. Effects managed may include effects observed by users of the stationary connected devices, or of the appliances or equipment with which they are associated. Effects managed may also include effects observed by providers and users of the network providing communication connectivity to the devices or by users of applications running on the stationary connected devices.

Embodiments of the present invention facilitate communication between a communication network such as a 3GPP network and an energy provider domain, comprising utility providers and other energy service providers. In facilitating such communication, embodiments of the present invention enable proactive management of the effects of forthcoming scheduled power outages.

Through calculation of the Impact Magnitude of a scheduled power outage, embodiments of the blackout management node of the present invention can provide useful information to stakeholders in stationary connected device systems, allowing those stakeholders to take appropriate action to mitigate unwanted effects of a scheduled power outage. The information provided to the stakeholders may be location based, allowing stakeholders to take action on the basic of geographic locations encompassing multiple connected devices, as opposed to acting uniquely on a device by device basis. The mitigating actions of stakeholders may include dynamic resource management, energy consumption scheduling, information provision, recommendation and a range of other actions, as discussed above.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned examples illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed by a node of a communication network, for managing effects of a scheduled outage of mains power, the method comprising:
receiving a notification of the scheduled outage of mains power, the notification comprising a location to be affected by the scheduled outage and a time period during which the scheduled outage is scheduled;
identifying mains powered devices registered on the communication network and situated in the notified location;
discovering an entity to be affected by an outage of at least one of the identified devices; and
informing the discovered entity that the identified devices are scheduled to be without power during the notified time period.

2. The method as claimed in claim 1, wherein informing the discovered entity comprises sending a message to the discovered entity, the message comprising identifiers of the identified devices and the notified time period.

3. The method as claimed in claim 2, further comprising:
selecting from among the identified devices those devices affecting the discovered entity;
determining an identifier for each of the selected devices with respect to the discovered entity; and
assembling the determined identifiers into the message.

4. The method as claimed in claim 1, wherein informing the discovered entity comprises publishing identifiers of the identified devices and the notified time period to a platform accessible by the discovered entity.

5. The method as claimed in claim 1, further comprising:
calculating an impact upon network resources of the scheduled power outage.

6. The method as claimed in claim 1, wherein the discovered entity comprises one of a network management node and an application or service provider.

7. The method as claimed in claim 1, the method further comprising comparing one or more locations associated with mains powered devices and the notified location, wherein identifying mains powered devices registered on the communication network and situated in the notified location is performed based on the comparison.

8. The method as claimed in claim 7, wherein discovering an entity to be affected by an outage of at least one of the identified devices comprises discovering what applications or services are running on at least one of the identified devices.

9. The method as claimed in claim 1, wherein the discovered entity comprises a recommendation engine or a Demand Response Automation Server.

10. The method as claimed in claim 1, wherein receiving a notification of a scheduled outage of mains power comprises receiving a notification directly from a mains power provider.

11. The method as claimed in claim 1, wherein receiving a notification of a scheduled outage of mains power comprises receiving a notification from a Demand Response Automation Server.

12. The method as claimed in claim 1, further comprising, after identifying mains powered devices registered on the communication network and situated in the notified location,
removing from the identified devices any devices supplied with mains power by a supplier other than the supplier scheduling the notified scheduled outage.

13. The method as claimed in claim 1, wherein identifying mains powered devices registered on the communication network and situated in the notified location comprises identifying Machine Type Communication Devices registered on the communication network and situated in the notified location.

14. The method as claimed in claim 13, wherein identifying mains powered devices registered on the communication network and situated in the notified location comprises identifying stationary Machine Type Communication Devices registered on the communication network and situated in the notified location.

15. A non-transitory computer readable storage medium storing a computer program product configured, when run on a computer, to carry out a method as claimed in claim 1.

16. A method, in a network node, for managing effects on a communications network of a scheduled outage of mains power, the method comprising:
receiving a message identifying mains powered devices registered on the communication network and to be, affected by the scheduled outage;
performing a calculation to determine an impact upon network resources of the scheduled outage; and
based on the calculation, applying at least one of a Quality of Service or Bandwidth or Charging policy, wherein the message comprises identifiers of the devices to be affected by the scheduled outage and a time period during which the scheduled outage is scheduled.

17. A communication network node configured for managing effects of a scheduled outage of mains power, the communication network node comprising a processor and a memory, the memory containing instructions executable by the processor whereby the communication network node is operative to:
receive a notification of the scheduled outage of mains power, the notification comprising a location to be affected by the scheduled outage and a time period during which the scheduled outage is scheduled;
identify mains powered devices registered on the communication network and situated in the notified location;
discover an entity to be affected by an outage of at least one of the identified devices; and
inform the discovered entity that the identified devices are scheduled to be without power during the notified time period.

18. The method as claimed in claim 17, wherein the communication network node is further operative to compare one or more locations associated with mains powered devices and the notified location, wherein identifying mains powered devices registered on the communication network and situated in the notified location is performed based on the comparison.

19. A communication network node configured for managing effects on a communications network of a scheduled outage of mains power, the communication network node comprising a processor and a memory, the memory containing instructions executable by the processor whereby the communication network node is operative to:
receive a message identifying mains powered devices registered on the communication network and to be affected by the scheduled outage;
perform a calculation to determine an impact upon network resources of the scheduled outage; and
based on the calculation, apply at least one of a Quality of Service or Bandwidth or Charging policy, wherein
the message comprises identifiers of the devices to be affected by the scheduled outage and a time period during which the scheduled outage is scheduled.

* * * * *